United States Patent

Schwellenbach et al.

Patent Number: 5,822,837
Date of Patent: Oct. 20, 1998

[54] PROCESS FOR PRODUCING A FRICTIONAL ENGAGEMENT

[75] Inventors: Kurt Schwellenbach, Neufahrn; Robert Lang, München, both of Germany

[73] Assignee: Fichtel & Sachs AG, Schweinfurt, Germany

[21] Appl. No.: 855,338

[22] Filed: May 13, 1997

[30] Foreign Application Priority Data

Jun. 17, 1996 [DE] Germany ............ 196 24 048.4

[51] Int. Cl.$^6$ .................................................. B23P 11/02
[52] U.S. Cl. .................................... 29/450; 403/383
[58] Field of Search ................... 29/450, 451; 403/383

[56] References Cited

U.S. PATENT DOCUMENTS

| | | | |
|---|---|---|---|
| 2,822,857 | 2/1958 | Rothermel et al. | 29/451 |
| 2,864,967 | 12/1958 | Redick et al. | 29/450 |
| 3,770,876 | 11/1973 | Post | 29/450 |
| 3,894,328 | 7/1975 | Jansson | 29/451 |
| 4,205,424 | 6/1980 | Nagao et al. | 29/451 |
| 4,294,562 | 10/1981 | Müllenberg | 403/383 |
| 4,378,622 | 4/1983 | Pinkston et al. | 29/450 |
| 4,389,440 | 6/1983 | Keith | 29/450 |
| 4,651,402 | 3/1987 | Bonfils . | |
| 4,693,136 | 9/1987 | Clerc et al. | 403/383 |
| 5,150,520 | 9/1992 | DeRisi . | |
| 5,429,574 | 7/1995 | Murakami | 403/383 |

FOREIGN PATENT DOCUMENTS 195 21 755  10/1996  Germany .

*Primary Examiner*—David P. Bryant
*Attorney, Agent, or Firm*—Cohen, Pontani, Lieberman & Pavane

[57] ABSTRACT

A process for producing a frictionally locking connection of two structural component parts, especially a shaft and a hub, including plastically deforming a round structural component part into an oval or polygonal shape by applying force, applying additional force to substantially elastically round the oval or polygonal structural component part, assembling the structural component parts while maintaining the additional force, and then cancelling the additional force so that the round structural component part springs back into the oval or polygonal shape whereby the structural component parts are connected with one another by a press fit.

3 Claims, 2 Drawing Sheets

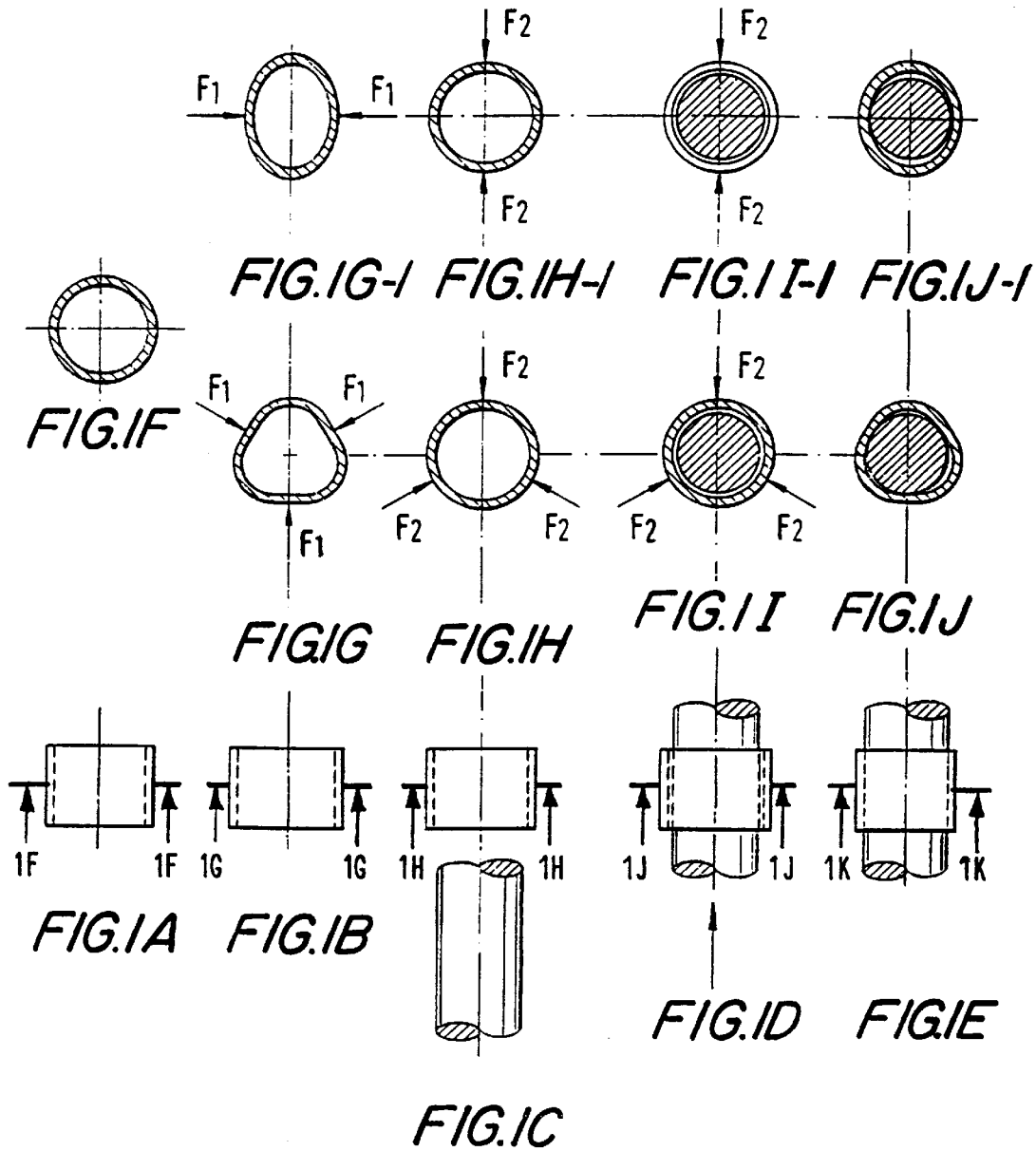

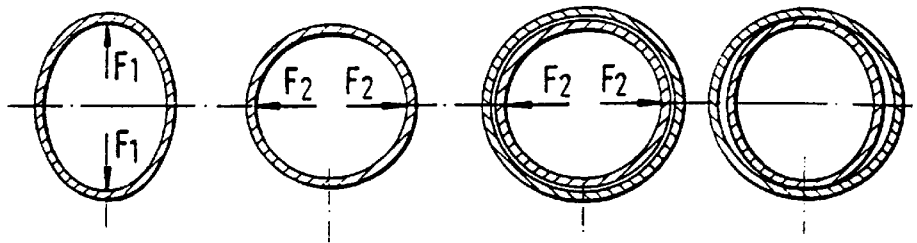
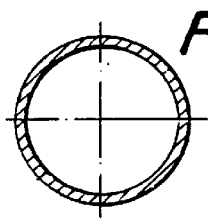
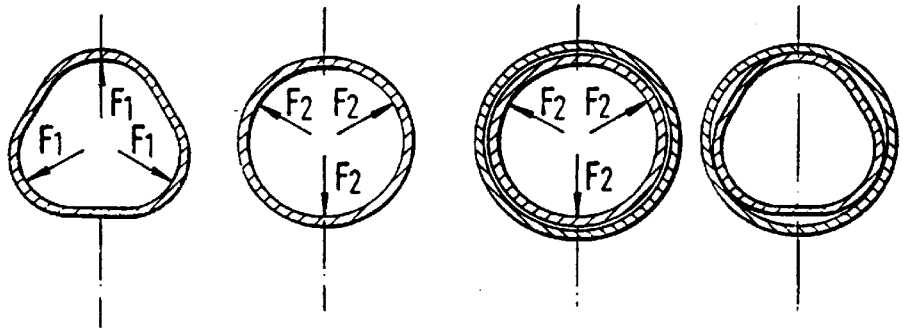
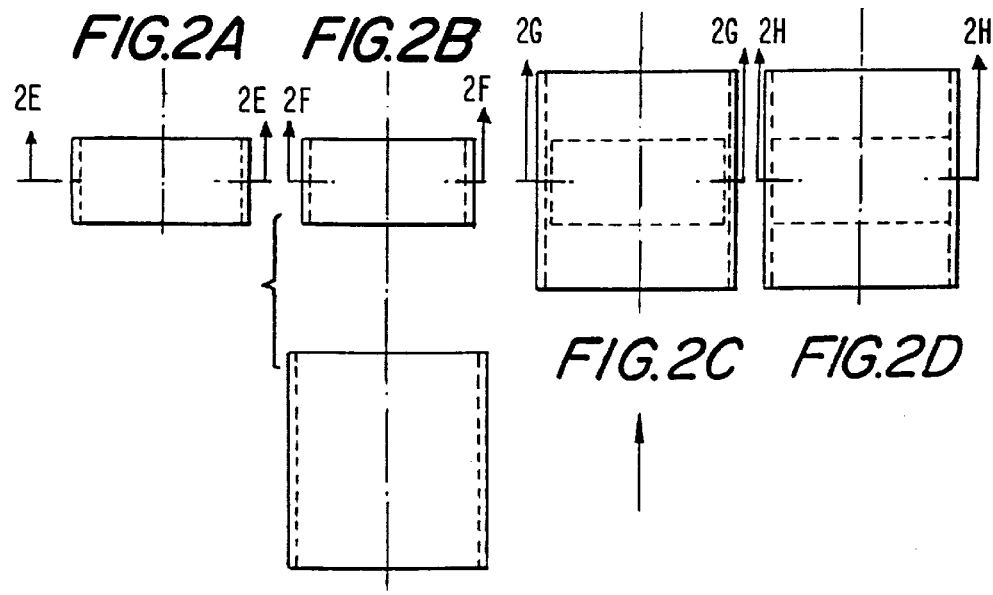

PROCESS FOR PRODUCING A FRICTIONAL ENGAGEMENT

BACKGROUND OF THE INVENTION

1. Field of the Invention

The invention relates to a process for producing a frictional engagement or frictionally locking connection between two structural component parts, especially a shaft and a hub.

2. Description of the Prior Art

Connections between a shaft and a hub in the form of a frictional engagement have been made in the past in the form of an interference fit or press fit. In so doing, the outer one of the parts has an inner diameter which is underdimensioned or the inner one of the parts has an outer diameter which is overdimensioned so that the surface can be damaged when the structural component parts are pushed together. Principally, chip particles can be formed, which may be undesirable depending upon the application of the shaft-hub connection.

SUMMARY OF THE INVENTION

The object of the present invention is to provide a connection between two structural component parts providing a press fit, wherein damage to the surface, e.g., formation of chips, is prevented when the structural component parts are joined together.

Pursuant to this object, and others which will become apparent hereafter, one aspect of the present invention resides in a round structural component part that is plastically deformed into an oval or polygonal shape by applying force and then, by applying additional force, the oval or polygonal structural component part is substantially elastically rounded. The structural component parts are assembled while maintaining the additional force. The additional force is then canceled so that the round structural component part springs back into an oval or polygonal shape so that the structural component parts are connected with one another by means of a press fit.

It is advantageous that the structural component parts are securely connected with one another without chip particles being formed on the surface during the joining process. This connection ensures, for example, a transmission of torque, a limiting stop or merely an axial fixing of the structural component parts relative to one another. In the reverse sequence of operations, such a connection can also be detached without damaging the surface of the parts to be connected.

According to another embodiment of the invention, the externally arranged structural component part is plastically deformed in an oval or polygonal shape by applying force. In a further embodiment, the structural component part arranged on the inside is plastically deformed in an oval or polygonal shape by applying force.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 1A through FIG. 1J-1 shows a process sequence in five steps for connecting a shaft and a hub in which the hub is deformed, pursuant to the present invention; and FIG. 2A through FIG. 2H-1 shows a process sequence in five steps for connecting a shaft and a hub in which the shaft is deformed.

DETAILED DESCRIPTION OF THE PREFERRED EMBODIMENTS

FIG. 1A through FIG. 1J-1 illustrate a process for mounting a hub on a shaft. In process step 1, FIGS. 1A and 1F a round hub is shown as an initial shape. The outer diameter of the hub is plastically, i.e., permanently, deformed by the application of a force F1. It will be seen from FIGS. 1G-1 through 1J-1 that the hub is deformed in an oval shape, while FIGS. 1G through 1J show that the hub is deformed in a polygonal shape by applying three forces F1 to the outer diameter. As shown in FIGS. 1C, 1H and 1H-1, immediately before the hub is mounted on the shaft, the hub is rounded in that a force F2 is applied to the greatest outer elliptical radius in the case of the ovally deformed hub or to the outer radii of the polygon in the case of the polygonally deformed hub. This rounding is effected substantially in the elastic range, i.e., when the externally acting force F2 is canceled, the hub should spring back into an oval or polygonal shape, as the case may be.

In the fourth step, FIGS. 1D, 1I and 1I-1 the hub is mounted on the shaft without canceling the force F2 at the greatest outer elliptical radius or at the outer radii of the polygon, as the case may be.

The final state is shown in process step 5, FIGS. 1E, 1J and 1J-1 in which the shaft and hub are joined. The active force F2 has been canceled so that the hub springs back into an oval or polygonal shape. The desired press fit of the hub and shaft is achieved.

FIGS. 2A through 2H-1 describe the process of mounting a shaft in a hub in five process steps. In process step 1, FIG. 2E-1 a round shaft is again taken as starting point. In the second process step, FIGS. 2A, 2E and 2E-2 the round shaft is plastically deformed, i.e., permanently deformed, by forces F1 acting on the inner diameter, i.e., from inside to outside. In FIGS. 2E-2, 2F-1, 2G-1 and 2H-1, the shaft is given an oval shape, while in FIGS. 2F through 2H the shaft is give a polygonal shape. The deformation is permanent.

In process step 3, FIGS. 2B, 2F and 2F-1 in a manner similar to FIGS. 1A through 1J-1, a force F2 is applied to the smallest inner elliptical radius in the oval shape or to the smallest inner reference circle or partial circle in the polygon (at the inner radius of the polygon) so that the shaft is rounded. This rounding is effected extensively in the elastic range, i.e., when the externally acting force F2 at the inner diameter is canceled, the shaft springs back into an oval or polygonal shape as the case may be.

In the fourth process step, FIGS. 2C, 2G and 2G-1 the shaft and hub are joined while maintaining force F2, wherein the hub is pushed home into its final position over the rounded shaft. After the hub and the rounded shaft have been joined in process step 4, the acting force F2 is canceled in process step 5, FIGS. 2D, 2H and 2H-1. The shaft accordingly springs back into an oval or polygonal shape, as the case may be. The desired press fit between the hub and shaft is also achieved in this embodiment example.

Other possible uses for such a shaft-hub connection include torque transmission, wherein either the hub or the shaft, if hollow, can be deformed. Further, bushings can be fixed axially on the shaft or in a pipe.

The invention is not limited by the embodiments described above which are presented as examples only but can be modified in various ways within the scope of protection defined by the appended patent claims.

We claim:

1. A process for producing a frictionally locking connection between first and second structural component parts by either inserting the second structural component part into the first structural component part or inserting the first structural component part into the second structural component part, the process comprising the steps of:

a) plastically deforming a first round structural component part one of an oval shape and a polygon shape by applying a force;

b) substantially elastically rounding the one of oval and polygonal first structural component part by applying an additional force;

c) assembling the first and second structural component parts while maintaining the additional force; and d) cancelling the additional force so that the rounded first structural component part springs back into the one of an oval and polygonal shape so that the structural component parts are frictionally connected with one another by a press fit.

2. A process according to claim 1, wherein step a) includes plastically deforming an outer one of the structural component parts.

3. A process according to claim 1, wherein step a) includes plastically deforming an inner one of the structural component parts.

* * * * *